United States Patent [19]

Yoshida et al.

[11] 4,209,050
[45] Jun. 24, 1980

[54] PNEUMATIC TIRES FOR HIGH SPEED VEHICLES

[75] Inventors: Shoji Yoshida, Higashikurume; Katsuyuki Harakon, Kodaira, both of Japan

[73] Assignee: Bridgestone Tire Company Limited, Tokyo, Japan

[21] Appl. No.: 953,725

[22] Filed: Oct. 20, 1978

[30] Foreign Application Priority Data

Oct. 28, 1977 [JP] Japan .................................. 52/128745

[51] Int. Cl.² .............................................. B60C 9/10
[52] U.S. Cl. .......................... 152/354 R; 152/357 R; 152/359; 152/362 R
[58] Field of Search ........... 152/353 R, 354 R, 356 R, 152/357 R, 359, 362 R

[56] References Cited

U.S. PATENT DOCUMENTS

| | | | |
|---|---|---|---|
| 2,939,503 | 6/1960 | Frohlich et al. | 152/354 |
| 3,280,877 | 10/1966 | Hanus | 152/354 |
| 3,682,223 | 8/1972 | Simpson | 152/362 R |
| 4,085,787 | 4/1978 | Maiocchi | 152/362 R |

FOREIGN PATENT DOCUMENTS 2364941  7/1974  Fed. Rep. of Germany ........... 152/359

*Primary Examiner*—John E. Kittle
*Attorney, Agent, or Firm*—Sughrue, Rothwell, Mion, Zinn and Macpeak

[57] ABSTRACT

A pneumatic tire for high speed running vehicles having an aspect ratio of 0.25 to 0.75 and a carcass composed of at least two plies each formed of a textile cord layer including parallel cords crossed with those of the other ply. The carcass satisfies the following conditions:

(1) The cord has an initial modulus of at least 100 g/denier;
(2) The cords are embedded in rubber having a modulus of elasticity at 300% elongation of 100 to 250 kg/cm²;
(3) The cords are inclined at an angle of 20° to 40° with respect to the equatorial plane of the tire;
(4) The cords have a gap ratio in each ply of 10 to 65% and a gap ratio between adjacent plies of 22 to 83%.

4 Claims, 4 Drawing Figures

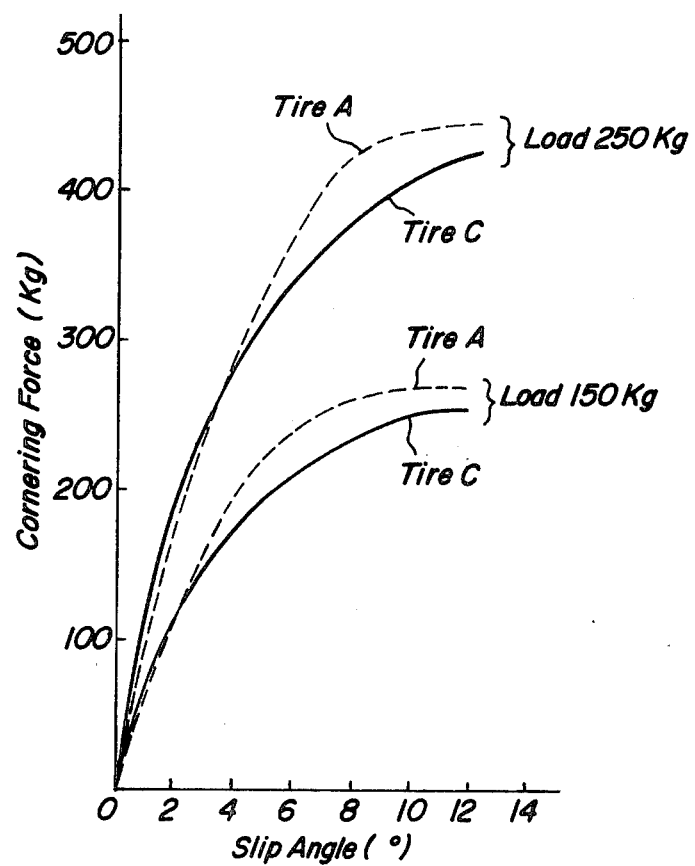
FIG_4

PNEUMATIC TIRES FOR HIGH SPEED VEHICLES

BACKGROUND OF THE INVENTION

1. Field of the Invention

This invention relates to a pneumatic tire for high speed vehicles and more particularly to an improvement in a carcass cross-sectional shape of an extremely low profile tire for racing cars having an aspect ratio within a range between 0.25 and 0.75 and a tread portion whose outer surface is substantially cylindrical.

2. Description of the Prior Art

Such kind of tire is required, in the first place, to have highly stable maneuverability, excellent accelerating and braking characteristics and better durability.

Contrary to tires used in general for passenger cars or trucks, the above mentioned kind of tire is not used for a long time under a mild speed condition, but is used for a relatively short time under an extremely high speed condition. As a result, if the above mentioned characteristics of the tire do not arrive at a given level, the tire could not satisfactorily run. In addition, if the construction and material of the tire is out of order, the tire is subjected to intensive mechanical and thermal stimulus, thereby inducing a breakage failure of the tire within an extremely short time.

Recent progress and development of the techniques related to automobiles result in a significant improvement in high speed performance of the tire. As a result, measures of improving the above mentioned tire characteristics to a higher level are now urgently in demand.

Various means have heretofore been proposed to improve the running performance of such kind of tire. In this case, it is, generally important to take into the consideration how to increase the ground contact area of the tire during running of the tire under load.

In the first place, it has been proposed to ensure a large ground contact area of the tire by deforming the tire such that the tire becomes wide in width and the cross-sectional plane of tire becomes flat. Such means, however, is limited by the construction of the car body.

Secondly, it has been proposed to ensure a large ground contact area of the tire in the peripheral direction thereof by making the outer diameter of the tire extremely large. Similar to the first proposed means, this second proposed means is also limited by the construction of the car body.

Finally, it has been proposed to ensure a large ground contact area by reducing the rigidity of the tread region and hence enlarging the ground contact area with the aid of the carcass construction. The above finally proposed means can obtain the large ground contact area by making the inclined angle of the carcass ply cords with respect to the equatorial plane of the tire large. In this way, the finally proposed means can successfully enlarge the ground contact area, but the carcass ply cord angle is large with respect to the circumferential direction of the tire, so that the effect of restraining the tread in the circumferential direction of the tire by means of the ply cords becomes reduced. As a result, the centrifugal force produced when the tire runs at a high speed causes the center region of the tread portion to be bulged, thereby degrading the durability of the tire. In addition, the transverse rigidity of the side portion becomes reduced, and as a result, the tire tends to be easily unstable when the tire is subjected to the exterior force during its turning movement.

In addition, when the tire runs along a straight road, there is a risk of the tire being subjected to standing wave phenomenon by the presence of the bulge protruded from the tread due to the centrifugal force and also by the reduced transverse rigidity.

SUMMARY OF THE INVENTION

An object of the invention, therefore, is to provide a pneumatic tire for high speed running vehicles which can significantly improve the above mentioned running performance required for such kind of tire by mainly improving its carcass construction without increasing or decreasing the outer diameter of the tire if compared with that of the conventional tire.

The inventors have recognized that such kind of tire must satisfy the following requirements for the purpose of improving the above mentioned required running performance.

1. When a tire runs at a high speed under loaded condition, the ground contact area must be made as large as possible.

2. The sidewall portion of the tire is required to have a transverse rigidity which is sufficient to withstand the exterior force subjected to the tire in the transverse direction.

3. When the tire runs, the bulge protruded from the tread must be made small.

The inventors have further investigated and analyzed in greater detail the above recognition and found out that the drawbacks which have been encountered with the prior art techniques can be eliminated by the following features.

(1) For a carcass reinforcing material, use is made of textile cords having an initial modulus which is sufficient to withstand the centrifugal force to be subjected to the circumference of the tread when a tire runs at an extra high speed.

(2) The carcass must have a cord gap ratio which is specifically defined for the purpose of bringing the tire tread into closely contact with the road surface.

(3) The carcass cords are embedded in a rubber layer having a specially defined physical property.

(4) The sidewall of the tire must effectively be reinforced.

Experimental tests repeatedly conducted on the above mentioned features have produced the result that the desired objects can effectively be attained by the following constitutional feature.

A feature of the invention is the provision of a pneumatic tire for high speed running vehicles comprising a carcass composed of at least two plies each formed of a textile cord layer including cords crossed with those of the other ply, a tread portion reinforced with said carcass, and a bead portion including a bead wire around which is wound each end of said carcass to form a turn-up portion. The aspect ratio of the tire sectional height H defined by a vertical distance from the top of the tread to the lower end of the bead portion to the maximum sectional width W of the tire and lies within a range between 0.25 and 0.75. Also, the cord has an initial modulus of at least 100 g/denier, and that said cords are embedded in rubber having a modulus of elasticity at 300% elongation of 100 to 250 kg/cm$^2$ with an inclined angle of 20° to 40° with respect to the equatorial plane of the tire, said cords having a gap ratio in each ply $(s_1/d) \times 100$ of 10 to 65% and a gap ratio between adjacent plies $(s_2/d) \times 100$ of 22 to 83% where $s_1$ is a distance between the cords in each ply, $s_2$ is a distance between the cords in adjacent plies and d is a diameter of the cord.

The invention may effectively be carried out into effect in the following manner.

1. The cord has a tensile breaking strength of at least 7 g/denier.
2. The cord is formed of an aromatic polyamide fiber.
3. The top end of the turn-up portion of the carcass is located at a position lying within a range of 30 to 80% of the tire sectional height.
4. Between the carcass and the turn-up portion thereof is interposed a hard rubber filler.
5. The hard rubber filler has a Shore A hardness of 60° to 90°.

In the specification, the initial modulus of the cord shall be understood to be represented by stress g/denier in the case of assuming 100% elongation with the inclination of the stress-strain curve remained within the elastic limit. The values of the gap ratio in each ply and the gap ratio between adjacent plies are of those values which are measured near the equatorial plane.

BRIEF DESCRIPTION OF THE DRAWINGS

FIG. 4 is a graph illustrating the running performance of the tire according to the invention as compared with that of the conventional tire.

DETAILED DESCRIPTION OF THE PREFERRED EMBODIMENTS

Figure 1:
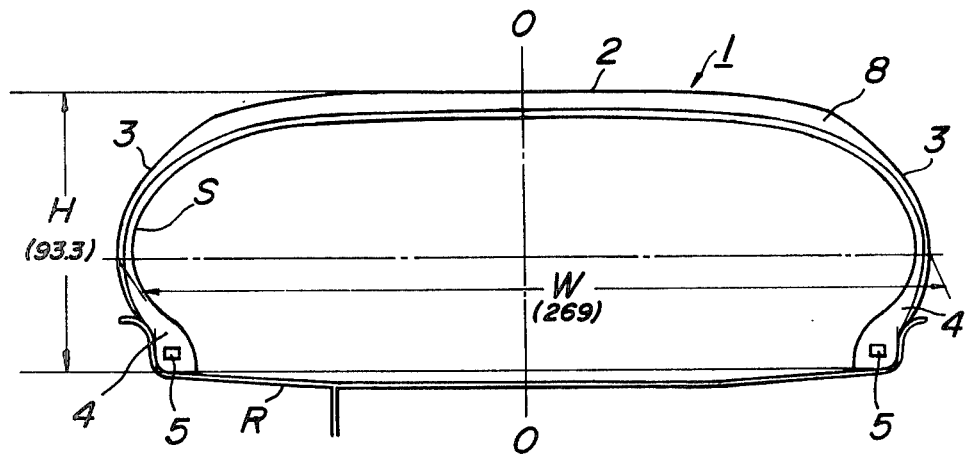
FIG. 1 is a diagrammatic cross-sectional view of one embodiment of a tire according to the invention.
Figure 2:
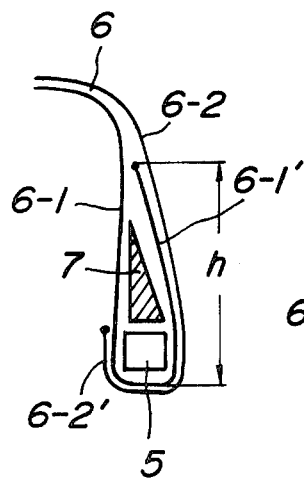
FIG. 2 is a diagrammatic cross-sectional view of the bead portion construction of the tire shown in FIG. 1.

FIG. 1 is a diagrammatic cross-sectional view of a tire embodying the present invention, the tire being shown under its inflated configuration after it has been united with a rim and FIG. 2 is a diagrammatic cross-sectional view of a bead portion showing in detail the main construction thereof. In FIG. 1, a tire 1 is provided at its center portion with a wide cylindrical tread 2 having ends made integral through toroid-shaped sidewall portions 3 with bead portions 4. Each bead portion 4 is provided at its lower end with an annular bead wire 5.

An aspect ratio H/W is determined within a range from 0.25 to 0.75 where H is a sectional height of the tire defined by a vertical distance from the top of the tread 2 to the lower end of the bead portion 4 and W is the maximum sectional width of the tire. As a result, the tire has a very low cross-sectional shape. The value of the aspect ratio H/W of the tire is measured when the tire is inflated after it has been united with a rim R.

The tread 2 is reinforced by a carcass 6 extending from one of bead portions 4 to the other bead portion 4 and composed of at least two plies each formed of a textile cord layer, each cord layer including equally spaced apart parallel cords crossing with those of the other cord layer. These plies of the carcass 6 are wound around the bead wire 5 to form turn-up portions thus firmly fixing the bead portion 4.

The cords constituting the cord layer of the ply of the carcass 6 are inclined at an angle within a range between 20° and 40°, preferably between 26° and 35° with respect to the equatorial plane 0—0 of the tire.

In the embodiment shown in FIG. 2, use is made of two plies 6-1, 6-2. The ply 6-1 is wound around the bead wire 5 from the inside toward the outside thereof to form a turn-up portion 6-1' having a height h which is 30 to 80% of the tire sectional height H. The other ply 6-2 is wound around the bead wire 5 from the outside toward the inside thereof to form a turn-up portion 6-2' having an upper end located at the upper end of the bead wire 5.

Between the ply 6-1 and that portion of the ply 6-2 which overlaps with the turn-up portion 6-1' of the ply 6-1 is interposed a hard rubber filler 7 which is triangular in section and extends from a bead wire contact position toward outwardly in a radial direction of the tire, the top end of the hard rubber filler 7 being located at substantially the center of the sidewall portion 3. The hard rubber filler 7 and the turn-up portion 6-1' of the ply 6-1 serve to reinforce a sidewall S of the tire.

In the present invention, the cord of the carcass 6 has an initial modulus of at least 100 g/denier and preferably a tensile breaking strength of at least 7 g/denier and is formed, for example, of aromatic polyamide fiber.

Figure 3:
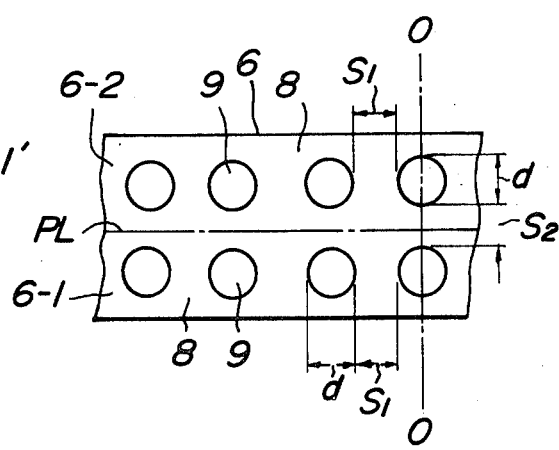
FIG. 3 is a partial cross-sectional view of the tread portion shown in FIG. 1 in an enlarged scale.

FIG. 3 shows that portion of the carcass which is located near the equatorial plane 0—0 in an enlarged scale. As shown in FIG. 3, the carcass 6 is composed of two plies 6-1 and 6-2 each formed of a cord layer embedded in a rubber layer 8, the cord layer including equally spaced apart parallel cords 9 each having an initial modulus of at least 100 g/denier and preferably a tensile breaking strength of at least 7 g/denier. The two plies 6-1 and 6-2 are superimposed one upon the other at a position shown by imaginary dot-dash lines PL.

In the present invention, the cords 9 are embedded in the rubber layer 8 with a gap ratio in each ply of 10 to 65% and with a gap ratio between adjacent plies of 22 to 83%. The gap ratio in each ply is defined by $(s_1/d) \times 100$ where $s_1$ is a distance between the cords 9, 9 in each ply and the gap ratio between adjacent plies is defined by $(s_2/d) \times 100$ where $s_2$ is a distance between the cords 9, 9 in adjacent plies. Both the gap ratio in each ply and the gap ratio between adjacent plies are greater than those of the conventional tire for high speed running vehicles. Such gap ratios can only be given to the carcass 6 when the cords having the above mentioned initial modulus are embedded in rubber whose 300% modulus of elasticity is relatively high, i.e. 100 to 250 kg/cm$^2$.

Experimental tests on model racing tires constructed as above described have demonstrated the following result.

A tire A according to the invention comprising a carcass composed of two plies each including a cord layer having cords formed of aromatic polyamide fiber of 1,500 denier/2 was compared with a conventional tire B which is the same in cords as the tire A according to the invention, but is different in the above mentioned features inclusive of the cord gap ratio in the carcass and was also compared with a conventional tire C comprising a carcass composed of four plies each including a cord layer having cords formed of nylon 6 of 840 denier/2.

All of the tires A, B and C are of bias laid construction in which parallel cords of each cord layer cross with those of the other cord layer and inclined at 28° with respect to the equatorial plane of the tire. Each of the tires A, B and C is united with a rim having a size of 10×13 and has the same aspect ratio H/W. That is, when the tire is inflated by an internal pressure of 1.0 kg/cm², the sectional height H is 93.3 mm and the maximum width W of the tire is 269 mm.

In the tire A according to the invention, the height h of the turn-up portion 6-1' shown in FIG. 2 was made 75% of the tire sectional height H and the upper end of a hard rubber filler 7 having a Shore A hardness of 80° was located at the center part of the sidewall S. In the conventional tires B and C, the height h of the turn-up portion 6-1' was made 25% of the tire sectional height H and the upper end of a rubber filler 7 having a Shore A hardness of 55° was located at a position which is slightly lower than the top end of the turn-up portion 6-1'.

The other specific values of the tires A, B and C are shown in the following Table 1.

Table 1

| Kind of Tire | A | B | C |
|---|---|---|---|
| Initial modulus of carcass cord (g/denier) | 185 | 185 | 30 |
| Tensile breaking strength of carcass cord (g/denier) | 15 | 15 | 7.5 |
| *Modulus of elasticity of carcass rubber | 200 | 80 | 80 |
| Gap ratio between cords in each ply (%) | 30 | 20 | 25 |
| Gap ratio between cords in adjacent plies (%) | 35 | 25 | 20 |

*Values of modulus of elasticity of carcass rubber at 300% elongation.

Each of these three kinds of tires A, B and C was mounted on a vehicle and run round a track of 4.3 km at an average speed of 190 to 200 km/hr. After running of 300 km, the tire was removed from the vehicle at every 1,000 km running. The tire was cut into two halves and a reduction of the separation resistant property between the plies at every 1,000 km running was measured.

The separation resistant property between the plies was measured in the following manner.

The tire tread was cut into its total thickness for a width of 25 mm along the poly cord at one side. Then, a slit was formed in the rubber layer interposed between the plies and these plies were held by chucks and subsequently the plies were forcedly separated from each other.

The separation resistant property produced at such time was measured. The separation resistant force is shown in the following Table 2 as a ratio of the separation resistant force after running to that measured when the tire is new.

Table 2

| | Kind of Tire | A | B | C |
|---|---|---|---|---|
| Separation resistant force (%) | New tire | 100 | 100 | 100 |
| | After 300 km running | 90 | 76 | 70 |
| | After 1,000 km running | 86 | 55 | 45 |

Note:
The value of the tire C is that measured between the second ply and the third ply.

As seen from the above Table 2, the interply separation resistant force of the conventional tires B and C becomes considerably reduced after running of the tire and becomes substantially one half smaller than that of the new tire after 1,000 km running. On the contrary, the interply separation resistant force of the tire A according to the invention becomes reduced only 14% of that of the new tire after 1,000 km running. This shows that the tire A according to the invention is safe against the carcass separation failure which is most dangerous in a speed competitive automobile race and that the tire according to the invention has highly excellent durability at high speeds.

In addition, the tire A according to the invention and the conventional tire C were inflated by applying an internal pressure of 1.0 kg/cm² and subjected to a load of 300 kg. Under such conditions, the braking characteristic of these tires A and C was measured. The braking characteristic is defined by both the maximum value of that braking force which is applied to the tire and gradually increased from that condition at which the tire runs when the relative slip between the tire and the road surface is substantially 0 and that value of the braking force which is produced when a slip ratio is 1, i.e. when the tire is completely locked.

Let the braking characteristic of the conventional tire C be 100. Then, the maximum value of the braking force of the tire A according to the invention is 106 and that value of the braking force which is obtained when the slip ratio is 1, is 105.

These values are obtained as an inevitable consequence of an improvement according to the invention which can make the ground contact surface larger by 11% when the internal pressure and load are the same, whereby the braking characteristic is correspondingly improved.

FIG. 4 is a graph showing the comparison between the cornering force of the tire A according to the invention which exerts an influence upon safe maneuverability of the tire and that of the conventional tire C. Both the tires A and C were inflated by applying an internal pressure of 1.0 kg/cm². As seen from FIG. 4, the cornering force of the tire A according to the invention becomes superior to that of the conventional tire C from a point where the slip angle which is particularly important for such tires is approximately 3°. In addition, the cornering force of the tire A according to the invention is superior to that of the conventional tire C when the slip angle is 8° under both loads of 150 kg and 250 kg. The cornering force of the conventional tire B is not shown in FIG. 4, but is substantially the same as that the conventional tire C.

As stated hereinbefore, the tire according to the invention is capable of exhibiting an excellent running performance, which has heretofore not be attained by prior art techniques, by incorporating textile cords having considerably large initial modulus into a carcass of a bias laid construction tire which is extremely flat in section.

What is claimed is:

1. A pneumatic tire for high speed running vehicles comprising; a carcass composed of two plies of textile cords having an initial modulus of at least 100 g/denier, said cords being inclined to the equatorial plane of the tire at an angle from 20° to 40° and the cords of one of said plies being crossed with those of the other ply, a tread portion, a pair of bead portions each including bead wires around which is wound each end of said carcass to form a turn-up portion, an aspect ratio of 0.25 to 0.75 defined by H/W where H is the sectional height of the tire and W is the maximum sectional width of the tire, said cords of the carcass having a gap ratio in each ply $(S_1/d) \times 100$ of 10% to 65% and a gap ratio between adjacent plies $(S_2/d) \times 100$ of 22% to 83% where $S_1$ is a distance between the cords in each ply, $S_2$ is a distance between the cords in adjacent plies and d is a diameter of the cord, and wherein said cords of the carcass are embedded in a rubber layer having a modulus of elasticity of 300% elongation of 100 kg/cm² to 250 kg/cm², said turn-up portion having a top end located at a range of 30% to 80% of the sectional height of the tire, and a hard rubber filler interposed between said carcass plies including said turn-up portion.

2. The pneumatic tire according to claim 1, wherein said cord has a tensile breaking strength of at least 7 g/denier.

3. The pneumatic tire according to claim 1, wherein said cord is formed of aromatic polyamide fiber.

4. The pneumatic tire according to claim 1, wherein said hard rubber filler has a Shore A hardness of 60° to 90°.

* * * * *